(12) United States Patent
Colomer et al.

(10) Patent No.: US 8,359,130 B2
(45) Date of Patent: Jan. 22, 2013

(54) METHOD AND DEVICE FOR ATTENUATING ON AN AIRCRAFT THE EFFECTS OF A VERTICAL TURBULENCE

(75) Inventors: Alexandre Colomer, Toulouse (FR); Xavier Dal Santo, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1292 days.

(21) Appl. No.: 12/089,680

(22) PCT Filed: Oct. 9, 2006

(86) PCT No.: PCT/FR2006/002256
§ 371 (c)(1),
(2), (4) Date: Apr. 9, 2008

(87) PCT Pub. No.: WO2007/042652
PCT Pub. Date: Apr. 19, 2007

(65) Prior Publication Data
US 2008/0251648 A1    Oct. 16, 2008

(30) Foreign Application Priority Data

Oct. 11, 2005   (FR) ...................................... 05 10341

(51) Int. Cl.
*G05D 1/08* (2006.01)
*B64C 13/16* (2006.01)
(52) U.S. Cl. ................. 701/10; 701/4; 701/9; 244/76 C; 244/174; 244/195; 244/203
(58) Field of Classification Search .................. 701/3, 4, 701/10, 11, 24; 244/198, 201, 203, 213–217, 244/75.1, 76 R, 174, 175, 194, 195, 76 C, 244/99.13; 356/28.5
See application file for complete search history.

(56) References Cited

U.S. PATENT DOCUMENTS 2,958,483 A    11/1960   McRuer
(Continued)

FOREIGN PATENT DOCUMENTS

EP          1 018 641         7/2000
(Continued)

OTHER PUBLICATIONS

International Search Report dated Feb. 27, 2007 w/ English translation.

(Continued)

*Primary Examiner* — Ruth Ilan
*Assistant Examiner* — George Spisich
(74) *Attorney, Agent, or Firm* — Dickinson Wright PLLC

(57) ABSTRACT

Disclosed are a method and device for attenuating vertical turbulence encountered by an aircraft during flight. Incorporated into the method and device is a wind determination device, which is used to determine a vertical wind component existing outside the aircraft. A severity level determination unit is used to determine a severity level of the vertical wind component determined by the wind determination device. A control unit calculates at least one control order based on the vertical wind component determined by the wind determination device. In addition, the control unit determines the actual existence of activation conditions determined according to the severity level determined by the severity level determination unit. Upon verifying the activation conditions, the control unit transmits the control order to at least one actuator of the at least one controllable movable member.

19 Claims, 2 Drawing Sheets

U.S. PATENT DOCUMENTS

| | | | |
|---|---|---|---|
| 3,856,402 A * | 12/1974 | Low et al. | 356/5.06 |
| 4,227,662 A | 10/1980 | Fisher | |
| 4,342,912 A * | 8/1982 | Adamson | 250/339.14 |
| 4,347,572 A * | 8/1982 | Berwick, Jr. et al. | 701/6 |
| 4,359,640 A * | 11/1982 | Geiger | 250/372 |
| 4,589,070 A * | 5/1986 | Kyrazis | 701/14 |
| 4,591,113 A | 5/1986 | Mabey | |
| 4,652,122 A * | 3/1987 | Zincone et al. | 356/28.5 |
| 4,763,266 A * | 8/1988 | Schultz et al. | 701/10 |
| 4,797,674 A * | 1/1989 | Zweifel et al. | 340/968 |
| 5,060,889 A * | 10/1991 | Nadkarni et al. | 244/183 |
| 5,082,207 A * | 1/1992 | Tulinius | 244/76 R |
| 5,797,105 A * | 8/1998 | Nakaya et al. | 701/7 |
| 6,034,760 A * | 3/2000 | Rees | 356/28.5 |
| 6,563,452 B1 * | 5/2003 | Zheng et al. | 342/26 R |
| 6,871,816 B2 * | 3/2005 | Nugent et al. | 244/3.16 |
| 6,917,860 B1 * | 7/2005 | Robinson et al. | 701/3 |
| 2007/0260366 A1 * | 11/2007 | Lacaze et al. | 701/3 |

FOREIGN PATENT DOCUMENTS

FR 2 756 644 6/1998

OTHER PUBLICATIONS

Written Opinion of the ISA w/ English translation.

* cited by examiner

METHOD AND DEVICE FOR ATTENUATING ON AN AIRCRAFT THE EFFECTS OF A VERTICAL TURBULENCE

FIELD OF THE INVENTION

The present invention relates to a method and a device for attenuating on an aircraft the effects of at least one vertical turbulence encountered by this aircraft in the course of a flight.

BACKGROUND OF THE INVENTION

It is known that in the course of a flight violent turbulences related to vertical wind bursts can cause at the aircraft level:
  significant variations in vertical load factor capable of causing injuries to the passengers of the aircraft;
  a significant altitude swing of the aircraft, thereby increasing the risk of collision with another aircraft; and
  lift surges on the wing, which tax the latter's load limits.

These violent turbulences can appear in clear sky and remain unforeseeable. Often, these phenomena which are localized surprise both the crew of the aircraft and the onboard piloting systems, which do not have time to perform the appropriate maneuvers to attenuate the effects thereof which result therefrom at the aircraft level.

It will be noted that, for a transport airplane, the appearance of negative vertical load factors is very dangerous for the passengers who are not firmly attached. They may indeed be thrown onto the ceiling and risk serious injuries.

The aforementioned problems are accentuated by the diversity of possible vertical turbulence profiles.

The object of the present invention is to remedy these drawbacks. It relates to a method making it possible to attenuate, in a particularly effective manner, on an aircraft, in particular a transport airplane, the effects of at least one vertical turbulence encountered by this aircraft in the course of a flight.

For this purpose, according to the invention, said method is noteworthy in that the following series of successive steps is carried out in an automatic and iterative manner in the course of the flight:
a) a vertical component of the wind existing outside the aircraft is determined at a current position of said aircraft;
b) with the aid of this vertical component of the wind, a severity level relating to a vertical turbulence existing outside the aircraft is determined at said current position;
c) with the aid of said vertical component of the wind, at least one control order is calculated for at least one controllable movable member which is capable of acting on the lift of the aircraft, said control order being such that it makes it possible to minimize the amplitude of the load factors generated on the aircraft by the vertical turbulence; and
d) a check is carried out to verify whether activation conditions depending at least on said severity level are realized; and
e) if said activation conditions are realized, said control order is transmitted to at least one actuator of said controllable movable member.

Thus, by virtue of the invention, a severity level of the vertical turbulence is determined so as to ascertain whether it is necessary to implement actions for attenuating the effects of the vertical turbulence. When such actions are necessary, the total lift of the aircraft is acted on (by way of said movable member), thereby making it possible to minimize the amplitude of the vertical load factor at any point of the cabin of the aircraft. The present invention thus makes it possible to combat the abrupt variations in vertical load factor that are generated by violent vertical turbulences of the aforementioned type.

SUMMARY OF THE INVENTION

In an advantageous manner, to determine the vertical component of the wind:
a1) the actual values of a plurality of parameters of the aircraft are measured at said current position; and
a2) said vertical component of the wind is calculated by taking account of said measured actual values.

In this case, advantageously, for an airplane:
  in step a1), are measured:
  with the aid of an inertial platform, the vertical speed Vz of the airplane relative to the ground, the angle $\phi$ of inclination of the wings of the airplane relative to the horizontal, the attitude $\theta$ of the airplane relative to the horizontal, and its pitch rate q;
  with the aid of an anemometric probe, the speed Vtas of the airplane relative to the air mass in which this airplane is traveling;
  with the aid of an incidence probe, the angle of incidence $\alpha$ of the airplane; and
  with the aid of a sideslip probe, the angle of sideslip $\beta$ of the airplane; and
  in step a2), the vertical component Wz of the wind is calculated with the aid of the following expression:
  ti $Wz = Vz + Vtas \cdot (\cos\phi \cdot \cos\theta \cdot \cos\beta \cdot \sin[\alpha + (q \cdot l/Vtas)] - \sin\theta \cdot \cos\beta \cdot \cos[\alpha + (q \cdot l/Vtas)] + \sin\beta \cdot \cos\theta \cdot \sin\phi)$
in which l represents the algebraic distance between the incidence probe and the center of gravity of the airplane.

Additionally, in an advantageous manner, the severity level of the vertical turbulence is determined as a function of the deviation in vertical load factor between a load factor at equilibrium for the aircraft and a load factor resulting from the vertical turbulence.

In this case, preferably, said severity level corresponds:
  to a first level, when said deviation in vertical load factor is less than or equal to a first predetermined value;
  to a second level, when said deviation in vertical load factor is greater than said first predetermined value and less than a second predetermined value; and
  to a third level, when said deviation in vertical load factor is greater than or equal to said second predetermined value.

In a first variant embodiment, said severity level of the vertical turbulence is determined on the basis of two linear combinations of the vertical component of the wind and of its derivative, and, in a second variant embodiment, said severity level is determined on the basis of the calculation of two probabilities.

Additionally, in a particular embodiment:
  said control order is calculated on the basis of a linear combination of the vertical component of the wind and of its derivative; and/or
  said activation conditions depend both on the severity level of the vertical turbulence and the deviation between the value of said control order and a predetermined threshold value.

In a particular embodiment, for an airplane, the control order is transmitted to at least one of the following movable members of the airplane: a spoiler and an aileron, and at least one auxiliary control order intended to compensate the pitch moment generated by the control of said movable member is determined (and transmitted to an elevator of the airplane).

The present invention also relates to a device for attenuating on an aircraft the effects of at least one vertical turbulence encountered by this aircraft, for example a transport airplane, in the course of a flight.

According to the invention, said device is noteworthy in that it comprises:

at least one controllable movable member which is capable of acting on the lift of the aircraft;

first means for determining a vertical component of the wind existing outside the aircraft at a current position of said aircraft;

second means for automatically determining, with the aid of this vertical component of the wind, a severity level relating to a vertical turbulence existing outside the aircraft at said current position;

third means for automatically calculating, with the aid of said vertical component of the wind, at least one control order for said controllable movable member, said control order being such that it makes it possible to minimize the amplitude of the load factors generated on the aircraft by the vertical turbulence; and fourth means for automatically verifying whether activation conditions depending at least on said severity level are realized, and for automatically transmitting said control order to at least one actuator of said controllable movable member, when said activation conditions are realized.

The device in accordance with the present invention therefore makes it possible to attenuate the amplitude of the vertical load factor generated by a vertical turbulence, and to do so at any point of the aircraft. It also makes it possible to reduce any variations in altitude.

Moreover, this device in accordance with the invention exhibits the advantage of being able to be installed on any type of aircraft (military, civil, commercial) furnished with at least one movable member (spoiler, aileron, . . . ) of arbitrary type having an effect on the lift.

In a particular embodiment, said first means comprise:

a set of measurement elements for automatically measuring the actual values of a plurality of parameters of the aircraft at said current position; and a calculation means for automatically calculating said vertical component of the wind, by taking account of said measured actual values.

Preferably, said set of measurement elements comprises at least one inertial platform, at least one anemometric probe and at least one incidence probe, as well as possibly at least one sideslip probe. The use of a sideslip probe makes it possible to increase the accuracy of the vertical component of the wind. Generally, the above measurement elements already exist on the aircraft, thereby making it possible in particular to reduce the cost of the device in accordance with the invention.

To yet further reduce the cost of said device, advantageously, said second and third means, as well as said calculation means, form part of an automatic piloting system of the aircraft.

BRIEF DESCRIPTION OF THE DRAWINGS

The figures of the appended drawing will elucidate the manner in which the invention may be realized. In these figures, identical references designate similar elements.

DETAILED DESCRIPTION OF THE INVENTION

Figure 1:
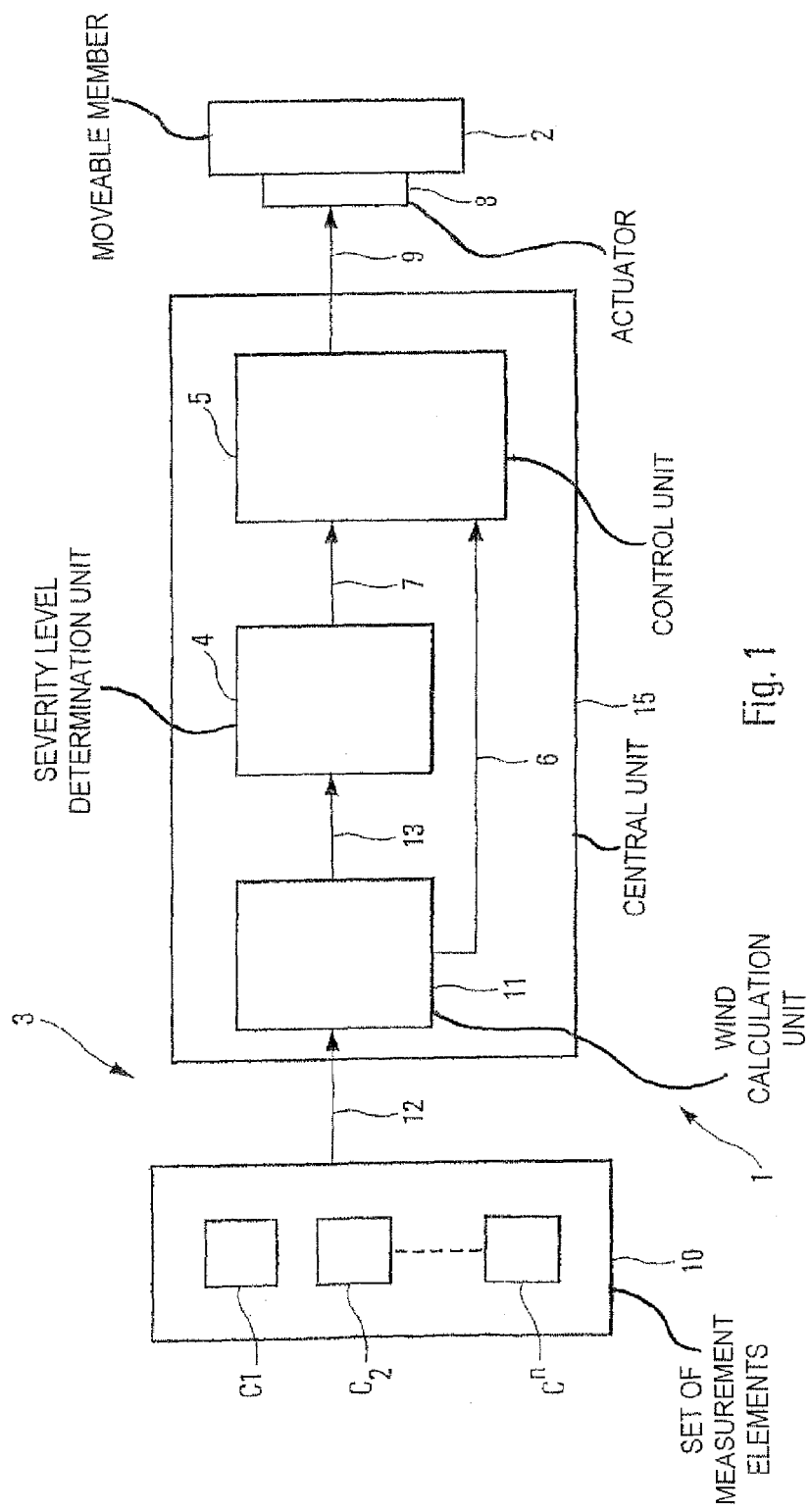
FIG. 1 is the schematic diagram of a device in accordance with the invention.

The device 1 in accordance with the invention and schematically represented in FIG. 1, is intended to attenuate on an aircraft (not represented), for example a transport airplane, the effects of at least one vertical turbulence encountered by this aircraft in the course of a flight. It is known that a turbulence corresponds to agitation of the air which is superimposed on the average movement of the air and which consists of haphazard movements, under continual transformation. Turbulence is encountered inside or in the vicinity of clouds (for example in a storm cloud where oppositely directed vertical currents coexist). There also exist clear sky turbulences, either near the ground, or principally at very high altitude in proximity to jet streams.

According to the invention, said device 1 comprises:

at least one movable member 2 which is controllable and which is capable of acting on the lift of the aircraft;

means 3 specified below, for determining a vertical component Wz of the wind which exists outside the aircraft at the current position of the latter;

means 4 for automatically determining, with the aid of the vertical wind component Wz received from said means 3, a severity level making it possible to characterize the vertical turbulence existing outside the aircraft at said current disposition; and means 5 for, successively:

automatically calculating, with the aid of the vertical wind component Wz received by way of a link 6, a control order for said controllable movable member 2.

This control order is such that it makes it possible to minimize the amplitude of the load factors which are generated on the aircraft by the vertical turbulence, as specified below;

automatically verifying whether activation conditions (which depend at least on said severity level received by way of a link 7 from said means 4) are realized; and automatically transmitting said calculated control order to a standard actuator 8 of said controllable movable member 2, by way of a link 9, when said activation conditions are realized and solely in this case.

Thus, the device 1 in accordance with the invention determines a severity level of the vertical turbulence, so as to ascertain whether it is necessary to implement actions for attenuating the effects of the vertical turbulence. When such actions are necessary, said device 1 acts (by way of said movable member 2) on the total lift of the aircraft, thereby making it possible to minimize the amplitude of the vertical load factor of the aircraft, and to do so at any point of its cabin. The device 1 in accordance with the present invention thus makes it possible to combat in particular the variations in vertical load factor which are generated by violent vertical turbulences and which are generally particularly abrupt.

In a preferred embodiment, said means 3 intended to determine the vertical component Wz of the wind, comprise:

a measurement unit 10 specified below, for measuring the actual value of a plurality of parameters of the aircraft at said current position; and a calculation means 11 which is connected by way of a link 12 to said measurement unit 10 and which is formed so as to calculate said vertical component Wz of the wind, by taking account of the actual values measured by said measurement unit 10.

For this purpose, said measurement unit 10 comprises a plurality of measurement elements or sensors C1, C2, . . . , Cn intended to measure the actual values of said aforementioned parameters of the aircraft.

Said calculation means 11 is connected by way of a link 13 to said means 4 and, by way of the link 6, to said means 5.

In a particular embodiment, said means 4 and 5 and said calculation means 11 are integrated within a central unit 15 which forms for example part of a standard automatic piloting system of the aircraft. As such an automatic piloting system in general already exists on the aircraft, this particular embodiment makes it possible to reduce the cost of the device 1 in accordance with the invention and to simplify its realization.

In a particular embodiment, said means 5 determine the severity level of the vertical turbulence, as a function of the deviation in vertical load factor between a load factor existing at equilibrium on the aircraft and a load factor existing in response to the vertical turbulence.

In this case, the severity level corresponds:

to a first level (called for example level 0), when said deviation in vertical load factor is less than or equal to a first predetermined value, for example 0.3 g, g corresponding to the value of the acceleration created at the surface of the earth by the gravitational force;

to a second level (called for example level 1), when said deviation in vertical load factor is greater than said first predetermined value (0.3 g for example) and is less than a second predetermined value, for example 0.5 g; and to a third level (called for example level 2), when said deviation in vertical load factor is greater than or equal to said second predetermined value (0.5 g for example).

In a first variant embodiment, said means 4 determine said severity level of the vertical turbulence on the basis of two linear combinations of the vertical component Wz of the wind and of its derivative. The coefficients of such a linear combination are optimized so that the levels are best recognized by the algorithm. If one of these combinations exceeds a first predetermined threshold, level 1 is obtained, and if the other exceeds a second predetermined threshold, level 2 is obtained. Level 2 has priority over level 1.

Furthermore, in a second variant embodiment, said means 4 determine said severity level on the basis of the calculation of two probabilities, namely on the one hand the probability of experiencing deviations of vertical load factor (within a predetermined forthcoming duration, for example within one second) of more than a first predetermined value, for example of more than 0.3 g, and on the other hand the probability of experiencing deviations of vertical load factor (for this predetermined forthcoming duration) of more than a second predetermined value, for example of more than 0.5 g. These two probabilities are calculated on the basis of the vertical wind component Wz received from the means 3, the angle of incidence α of the aircraft and the pitch rate q of the aircraft. If the probability associated with the deviations of 0.3 g exceeds a predetermined threshold, level 1 is obtained. If the probability associated with the deviations of 0.5 g exceeds another predetermined threshold, level 2 is obtained. The probability formulae are given on the basis of the training of neural nets. Level 2 has priority over level 1.

Furthermore, in a particular embodiment, said means 5 calculate said control order for the movable member 2 on the basis of a linear combination of the vertical component Wz of the wind and of its derivative.

Furthermore, said activation conditions taken into account by the means 5 depend on the severity level of the vertical turbulence, received from said means 4 by way of the link 7, as well as the value of said control order, which is compared with a threshold value. For the system to be activated (that is to say the activation conditions to be realized), it is necessary, in the aforementioned example, for the severity level to be at least at level 1 and the control order to exceed a predetermined threshold value. Thereafter, if the control order remains less than a predetermined value, for a predetermined time, without appearance of level 2, the control order is cancelled. The control order is also cancelled if the severity level goes from level 2 to level 1, with a derivative of the incidence which is negative.

Figure 2:
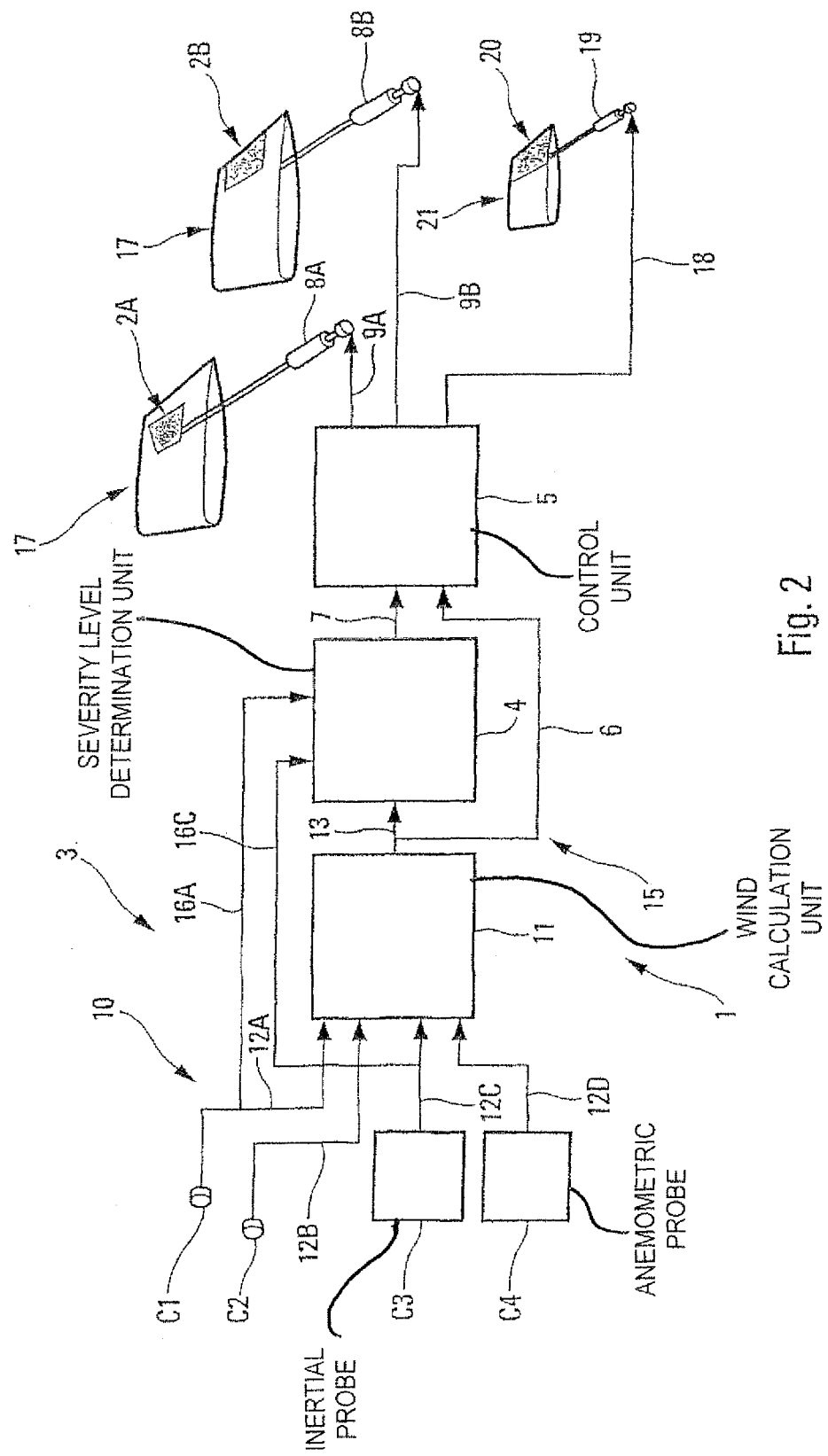
FIG. 2 schematically shows a particular exemplary embodiment of a device in accordance with the invention.

In a preferred embodiment represented in FIG. 2, which is applied to an airplane, said measurement unit 10 comprises as sensors C1, C2, C3 and C4 which are connected respectively by way of links 12A, 12B, 12C and 12D to said calculation means 11:

a standard incidence probe C1, for measuring the angle of incidence α of the airplane;

a standard sideslip probe C2, for measuring the angle of sideslip β of the airplane;

a standard inertial platform C3, for measuring the vertical speed Vz of the airplane relative to the ground, the angle φ of inclination of the wings of the airplane relative to the horizontal, the attitude θ of the airplane relative to the horizontal, and its pitch rate q; and a standard anemometric probe C4, for measuring the speed Vtas of the airplane relative to the air mass in which this airplane is traveling.

In this example, the calculation means 11 calculates the vertical component Wz of the wind, with the aid of the following expression:

$$Wz = Vz + Vtas \cdot (\cos \phi \cdot \cos \theta \cdot \cos \beta \cdot \sin [\alpha + (q \cdot l / Vtas)] - \sin \theta \cdot \cos \beta \cdot \cos [\alpha + (q \cdot l / Vtas)] + \sin \beta \cdot \cos \theta \cdot \sin \phi)$$

in which l represents the algebraic distance between the incidence probe C1 and the center of gravity of the airplane.

Moreover, in this example of FIG. 2, the incidence probe C1 is connected by way of a link 16A with the means 4 for providing them with the angle of incidence α, and the inertial platform C3 is connected by way of a link 16C with said means 4 for providing them with the pitch rate q. This angle of incidence α and this pitch rate q can be used by the means 4 for determining the severity level of the vertical turbulence, in accordance with the second aforementioned variant embodiment.

Furthermore, in the example of FIG. 2, the device 1 in accordance with the invention comprises as movable member:

at least one standard spoiler 2A, which is mounted on a wing 17 of the airplane and which is associated with a standard actuation means 8A connected by way of a link 9A to said means 5; and at least one standard aileron 2B, which is also mounted on a wing 17 and which is associated with a standard actuator 8B connected by way of a link 9B to said means 5.

As indicated previously, the control orders for the spoiler or spoilers 2A and the aileron or ailerons 2B are obtained on the basis of a linear combination of the vertical component Wz of the wind and of its derivative.

Furthermore, in a particular embodiment, said means 5 moreover determine an auxiliary control order, and they transmit this auxiliary control order, by way of a link 18, to a standard actuator 19 of a standard elevator 20 which is mounted on a horizontal empennage 21 of the airplane. This auxiliary control order is intended to compensate the pitch moment which is generated by the control (in accordance with the invention) of the spoiler or spoilers 2A and of the aileron or ailerons 2B. Said auxiliary control order is proportional to the control orders of the spoiler or spoilers 2A and of the aileron or ailerons 2B, according to a gain calculated on the basis of the case of flight (mass, platform, speed and altitude of the airplane). The various orders are put in phase. Putting in phase consists in equalizing the time required for each movable element (movable member 2A, 2B; elevator 20) to attain the setpoint value. This time is chosen to be that of the slowest movable element (movable member 2A, 2B; elevator 20).

Of course, the control orders determined in accordance with the present invention are superimposed on the orders provided in a standard manner by other piloting members of the aircraft, before being transmitted to the actuators 8A, 8B, 19 of the movable elements (movable member 2A, 2B; elevator 20). Thus, the device 1 in accordance with the invention also applies equally well to an aircraft manual flight control system as to an aircraft automatic flight control system.

The device 1 in accordance with the present invention therefore makes it possible to attenuate the amplitude of the vertical load factor generated by a vertical turbulence, and to do so at any point of the aircraft. It also makes it possible to reduce any variations in altitude.

Moreover, this device 1 in accordance with the invention exhibits the advantage of being able to be installed on any type of aircraft (military, civil, commercial) furnished with at least one movable member of arbitrary type (spoiler 2A, aileron 2B) having an effect on the lift of the aircraft.

Within the framework of the present invention, the aforementioned mode of calculating the vertical component Wz of the wind can be supplemented or replaced with a specific probe or with information external to the aircraft's systems, for example weather report communications received from the ground or another aircraft.

The invention claimed is:

1. A method for attenuating vertical turbulence encountered by an aircraft during flight, the method comprising the steps of:
   a) determining, by a wind determination device, a vertical wind component existing outside the aircraft at a current position of said aircraft;
   b) determining, by a severity level determination unit, according to said determined vertical wind component, a severity level of the vertical turbulence existing outside the aircraft at said current position as a function of deviation in vertical load between a load factor at equilibrium for the aircraft and a load factor resulting from the vertical turbulence;
   c) calculating, by a control unit, according to said determined vertical wind component, at least one control order to control at least one controllable movable member configured to act on aircraft lift, said control order controlling amplitude of the vertical load generated on the aircraft by the vertical turbulence;
   d) determining, by said control unit, existence of activation conditions based on verification of the severity level of the vertical turbulence and deviation between a value of the control order and a predetermined threshold value; and
   e) transmitting, by said control unit, said control order to at least one actuator of said at least one controllable movable member,
   wherein:
   said control order is transmitted to said at least one actuator of said at least one controllable movable member, upon the determination of the existence of said activation conditions.

2. The method as claimed in claim 1, wherein, the vertical wind component is calculated according to the steps of:
   a1) measuring actual values of a plurality of parameters of the aircraft at said current position; and
   a2) calculating said vertical wind component according to said measured actual values.

3. The method as claimed in claim 2, wherein:
   in step a1), the measuring is carried out by:
   an inertial platform, with the measurements including vertical speed Vz of the airplane relative to the ground, angle $\phi$ of inclination of the wings of the airplane relative to horizontal, attitude $\theta$ of the airplane relative to the horizontal, and pitch rate q;
   an anemometric probe, with the measurements including speed Vtas of the airplane relative to air mass in which the airplane is traveling;
   an incidence probe, with the measurements including angle of incidence $\alpha$ of the airplane; and
   a sideslip probe, with the measurements including angle of sideslip $\beta$ of the airplane; and
   in step a2), the vertical wind component is calculated according to the following expression, in which Wz is the vertical wind component:
   $Wz=Vz+Vtas \cdot (\cos \phi \cdot \cos \theta \cdot \cos \beta \cdot \sin [\alpha+(q \cdot l/Vtas)] - \sin \theta \cdot \cos \beta \cdot \cos [\alpha+(q \cdot l/Vtas)] + \sin \beta \cdot \cos \theta \cdot \sin \phi)$ in which l represents an algebraic distance between the incidence probe and the airplane center of gravity.

4. The method as claimed in claim 1, wherein said severity level corresponds:
   to a first level, when said deviation in vertical load is less than or equal to a first predetermined value;
   to a second level, when said deviation in vertical load is greater than said first predetermined value and less than a second predetermined value; and
   to a third level, when said deviation in vertical load is greater than or equal to said second predetermined value.

5. The method as claimed in claim 1, wherein in step b), the severity level of the vertical turbulence is determined according to two linear combinations of the vertical wind component of the wind and a derivative of the vertical wind component.

6. The method as claimed in claim 1, wherein in step b), the severity level of the vertical turbulence is determined according to a calculation based on two probabilities.

7. The method as claimed in claim 1, wherein in step c), said control order is calculated according to a linear combination of the vertical wind component and a derivative of the vertical wind component.

8. The method as claimed in claim 1, wherein in step d), the control order is transmitted to at least one of the following movable members of the airplane: a spoiler and an aileron; and at least one auxiliary control order that compensates for pitch moment generated by the control of said movable member is determined and transmitted to an elevator of the airplane.

9. A device for attenuating vertical turbulence encountered by an aircraft during flight, said device comprising:
   at least one controllable movable member configured to act on aircraft lift;
   wind determination device configured to determine a vertical wind component existing outside the aircraft at a current position of said aircraft;
   control unit configured to calculate, according to said determined vertical wind component, at least one control order for said at least one controllable movable member, said at least one control order controlling amplitude of vertical load generated on the aircraft by the vertical turbulence; and
   severity level determination unit configured to determine, according to said determined vertical wind component, a severity level of the vertical turbulence existing outside the aircraft at said current position as a function of deviation in the vertical load between a load factor at equilibrium for the aircraft and a load factor resulting from the vertical turbulence, wherein:

said control unit is further configured to transmit said at least one control order to at least one actuator of said at least on controllable movable member, and said control unit is additionally configured to determine existence of activation conditions based on verification of the severity level of the vertical turbulence and deviation between a value of the control order and a predetermined threshold level, and to transmit, upon determination of the existence of said activation conditions, said control order to said actuator of said controllable movable member.

10. The device as claimed in claim 9, wherein said wind determination device comprises:

a set of measurement elements configured to measure actual values of a plurality of parameters of the aircraft at said current position; and a wind calculation unit configured to calculate said vertical wind component according to said measured actual values.

11. The device as claimed in claim 10, wherein said set of measurement elements comprises at least one inertial platform, at least one anemometric probe and at least one incidence probe.

12. The device as claimed in claim 11, wherein said set of measurement elements comprises at least one sideslip probe.

13. The device as claimed in claim 9, wherein said severity level determination unit, said calculation unit, and said calculation unit form part of an automatic piloting system of the aircraft.

14. The device as claimed in claim 9, wherein said at least one movable member is a spoiler.

15. The device as claimed in claim 9, wherein said at least one movable member is an aileron.

16. An aircraft, comprising the device of claim 9.

17. A method for attenuating vertical turbulence encountered by an aircraft during flight, the method comprising the steps of:

a) determining, by a wind determination device, a vertical wind component existing outside the aircraft at a current position of said aircraft;

b) determining, by a severity level determination unit, according to said determined vertical wind component, a severity level of the vertical turbulence existing outside the aircraft at said current position as a function of deviation in vertical load between a load factor at equilibrium for the aircraft and a load factor resulting from the vertical turbulence;

c) calculating, by a control unit, according to said determined vertical wind component, at least one control order to control at least one controllable movable member configured to act on aircraft lift of the aircraft, said control order controlling amplitude of the vertical load generated on the aircraft by the vertical turbulence;

d) determining, by said control unit, existence of activation conditions based on verification of the severity level of the vertical turbulence and deviation between a value of the control order and a predetermined threshold value; and e) transmitting, by said control unit, said control order to at least one actuator of said at least one controllable movable member, wherein:

said control order is transmitted to said at least one actuator of said at least one controllable movable member, upon the determination of the existence of said activation conditions, and the vertical wind component is calculated according to the steps of:

a1) measuring actual values of a plurality of parameters of the aircraft at said current position by:

an inertial platform, with the measurements including vertical speed Vz of the airplane relative to the ground, angle $\phi$ of inclination of the wings of the airplane relative to horizontal, attitude $\theta$ of the airplane relative to the horizontal, and pitch rate q;

an anemometric probe, with the measurements including speed Vtas of the airplane relative to air mass in which the airplane is traveling;

an incidence probe, with the measurements including the angle of incidence $\alpha$ of the airplane; and a sideslip probe, with the measurements including angle of sideslip $\beta$ of the airplane; and a2) calculating said vertical wind component according to the following expression, in which Wz is the vertical wind component:

$Wz=Vz+Vtas \cdot (\cos\phi \cdot \cos\theta \cdot \cos\beta \cdot \sin[\alpha+(q \cdot l/Vtas)] - \sin\theta \cdot \cos\beta \cdot \cos[\alpha+(q \cdot l/Vtas)] + \sin\beta \cdot \cos\theta \cdot \sin\phi)$ in which l represents an algebraic distance between the incidence probe and the airplane center of gravity.

18. A method for attenuating vertical turbulence encountered by an aircraft during flight, the method comprising the steps of:

a) determining, by a wind determination device, a vertical wind component existing outside the aircraft at a current position of said aircraft;

b) determining, by a severity level determination unit, according to said determined vertical wind component, a severity level of the vertical turbulence existing outside the aircraft at said current position as a function of deviation in vertical load between a load factor at equilibrium for the aircraft and a load factor resulting from the vertical turbulence;

c) calculating, by a control unit, according to said determined vertical wind component, at least one control order to control at least one controllable movable member configured to act on aircraft lift of the aircraft, said control order controlling amplitude of the vertical load generated on the aircraft by the vertical turbulence;

d) determining, by said control unit, existence of activation conditions based on verification of the severity level of the vertical turbulence and deviation between a value of the control order and a predetermined threshold value; and e) transmitting, by said control unit, said control order to at least one actuator of said at least one of the following movable members of the airplane: a spoiler and an aileron, wherein:

at least one auxiliary control order, which compensates for pitch moment generated by said movable member, is determined and transmitted to an elevator mounted on a horizontal empennage of the airplane, with said auxiliary control order being proportional to the at least one control order transmitted to the at least one actuator of the spoiler or aileron, with each order calculated on a phase basis according to equalizing time movement between each moveable member.

19. The method as claimed in claim 18, wherein the control order is determined and superimposed on preexisting orders being transmitted to the actuators of the movable elements.

* * * * *